United States Patent
Kang

(10) Patent No.: US 12,190,734 B2
(45) Date of Patent: Jan. 7, 2025

(54) REAR LATERAL BLIND-SPOT WARNING SYSTEM AND METHOD FOR VEHICLE

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 437 days.

(21) Appl. No.: 17/411,559

(22) Filed: Aug. 25, 2021

(65) Prior Publication Data

US 2022/0068138 A1    Mar. 3, 2022

(30) Foreign Application Priority Data

Aug. 26, 2020   (KR) .......................... 10-2020-0108101

(51) Int. Cl.
  *G08G 1/16*    (2006.01)
  *B60Q 9/00*    (2006.01)
  *G01S 13/931*  (2020.01)

(52) U.S. Cl.
  CPC ............. *G08G 1/167* (2013.01); *B60Q 9/008* (2013.01); *G01S 2013/9315* (2020.01); *G01S 2013/9323* (2020.01); *G01S 2013/9324* (2020.01)

(58) Field of Classification Search
  CPC ......... B60W 30/0956; B60W 2552/50; G08G 1/167; B60Q 9/008; G01S 2013/9323; G01S 2013/9315; B60Y 2300/08
  (Continued)

(56) References Cited

U.S. PATENT DOCUMENTS 9,947,228 B1*   4/2018   Kim ........................ G08G 1/04
2010/0318263 A1   12/2010   Hayakawa et al.
(Continued)

FOREIGN PATENT DOCUMENTS

CN   111516677 A     8/2020
CN   111516677 B  *  3/2023   ............ B60W 30/08
(Continued)

OTHER PUBLICATIONS

Office Action issued in corresponding Chinese Patent Application No. 202110980719.6 dated Apr. 28, 2023.
(Continued)

*Primary Examiner* — Todd Melton
*Assistant Examiner* — Vincent Feng
(74) *Attorney, Agent, or Firm* — MORGAN, LEWIS & BOCKIUS LLP

(57) ABSTRACT

A rear lateral blind-spot warning system includes a detection sensor installed in a vehicle to sense an obstacle located in a rear blind spot or a lateral blind spot of the vehicle, a sequence setter configured to set the sequence, among multiple predetermined conditions, of determining, based on a sensing range of the detection sensor and the multiple predetermined conditions, whether the conditions are satisfied, and a warning determiner configured to sequentially determine, based on the sequence set by the sequence setter, whether the obstacle sensed by the detection sensor satisfies the multiple predetermined conditions and to determine, based on the result of the determination with regard to satisfaction of the conditions, whether the sensed obstacle is a target to be monitored.

18 Claims, 6 Drawing Sheets

(58) Field of Classification Search
USPC .......................................................... 701/119
See application file for complete search history.

(56) References Cited

U.S. PATENT DOCUMENTS

| | | | | |
|---|---|---|---|---|
| 2015/0029012 | A1* | 1/2015 | Mitani | G08G 1/165 |
| | | | | 340/436 |
| 2017/0352270 | A1* | 12/2017 | Tanaka | G08G 1/165 |
| 2018/0257646 | A1 | 9/2018 | Takeuchi | |
| 2019/0019412 | A1 | 1/2019 | Roca et al. | |
| 2019/0315345 | A1* | 10/2019 | Newman | B60W 50/14 |
| 2020/0160717 | A1* | 5/2020 | He | G08G 1/167 |
| 2020/0247412 | A1* | 8/2020 | Wang | B60W 50/14 |
| 2021/0155232 | A1* | 5/2021 | Ike | B60W 30/0956 |

FOREIGN PATENT DOCUMENTS

| | | | |
|---|---|---|---|
| EP | 3 342 671 A1 | | 7/2018 |
| JP | 2009086788 A | * | 4/2009 |
| KR | 10-2017-0067562 A | | 6/2017 |
| WO | WO-02095445 A1 | * | 11/2002 ............. B60Q 9/008 |

OTHER PUBLICATIONS

Extended European Search Report issued in corresponding European Patent Application No. 21191258.9 dated Feb. 24, 2022.

\* cited by examiner

| No (O) | CONVENTIONAL ART | PRESENT INVENTION |
|---|---|---|
| 1 | 5 | 2 |
| 2 | 5 | 2 |
| 3 | 5 | 4 |
| 4 | 5 | 3 |
| 5 | 5 | 2 |
| 6 | 5 | 2 |
| 7 | 5 | 4 |
| 8 | 5 | 3 |
| 9 | 5 | 1 |
| 10 | 5 | 1 |
| 11 | 5 | 1 |
| 12 | 5 | 1 |
| 13 | 5 | 1 |
| 14 | 5 | 1 |
| 15 | 5 | 1 |
| 16 | 5 | 1 |
| TOTAL | 80(16*5) | 30 |

REAR LATERAL BLIND-SPOT WARNING SYSTEM AND METHOD FOR VEHICLE

CROSS-REFERENCE TO THE RELATED APPLICATION

This application claims priority from Korean Patent Application No. 10-2020-0108101, filed on Aug. 26, 2020, in the Korean Intellectual Property Office, the disclosure of which is incorporated herein by reference in its entirety.

BACKGROUND

1. Technical Field

The present disclosure relates to a rear lateral blind-spot warning system and method for a vehicle, and more particularly to a rear lateral blind-spot warning system and method for monitoring a blind spot on the rear lateral side of a host vehicle or supporting a lane-change assist function.

2. Description of the Related Art

A rear lateral blind-spot warning system for a vehicle is a system that provides a warning to a driver when an obstacle is present in a blind spot on the rear lateral side of a host vehicle, which is traveling, or when it is determined that there is a risk of collision between the host vehicle, which intends to change lanes to the left or right, and another vehicle approaching at a high speed from an area behind the host vehicle, thereby improving driver convenience.

Specifically, examples of rear lateral blind-spot warning systems include a blind-spot detection (BSD) system, which announces the presence of an obstacle in a rear lateral blind spot to a driver, and a lane-change assist (LCA) system, which determines the probability of a collision between a host vehicle, which intends to change lanes to the left or right, and another vehicle approaching at a high speed in a rear lateral blind spot, and provides a collision warning to a driver. Recently, a rear lateral blind-spot warning system capable of simultaneously implementing a BSD function and an LCA function and thus of performing sensing in a broader area has been developed in order to effectively provide a warning to a driver.

The conventional rear lateral blind-spot warning system for a vehicle determines whether all of the targets sensed by a radar sensor for sensing an area on the rear lateral side of a host vehicle satisfy predetermined warning conditions. Recently, the center frequency of a radar sensor for sensing an area on the rear lateral side of a host vehicle has changed so as to improve the sensing performance of the radar sensor, and accordingly the number of targets that can be sensed by the radar sensor has increased, leading to an increase in the amount of computation, resulting in an increase in the time taken to determine whether the predetermined warning conditions are satisfied.

The information disclosed in this Background section above is only for enhancement of understanding of the general background of the present disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a rear lateral blind-spot warning system and method for a vehicle capable of rapidly and efficiently determining whether a target located in an area on the rear lateral side of a host vehicle satisfies predetermined warning conditions.

In accordance with an aspect of the present disclosure, the above and other objects can be accomplished by the provision of a rear lateral blind-spot warning system for a vehicle, including a detection sensor installed in a vehicle to sense an obstacle located in a rear blind spot or a lateral blind spot of the vehicle, a sequence setter configured, based on the sensing range of the detection sensor and multiple predetermined conditions, to set the sequence, among the multiple predetermined conditions of determining whether the conditions are satisfied, and a warning determiner configured to sequentially determine, based on the sequence set by the sequence setter, whether the obstacle sensed by the detection sensor satisfies the multiple predetermined conditions and to determine, based on the result of the determination with regard to satisfaction of the conditions, whether the sensed obstacle is a target to be monitored.

When the obstacle sensed by the detection sensor does not satisfy any one of the multiple predetermined conditions, the warning determiner may stop sequential determination for remaining conditions of the multiple predetermined conditions and may determine that the sensed obstacle is not a target to be monitored.

When the obstacle sensed by the detection sensor satisfies all of the multiple predetermined conditions, the warning determiner may determine that the sensed obstacle is a target to be monitored.

The sequence setter may calculate a satisfaction level of each of the multiple predetermined conditions based on the sensing range of the detection sensor and may set, based on the calculated satisfaction level, the sequence of determining whether the multiple predetermined conditions are satisfied.

The sequence setter may set the sequence of determining whether the multiple predetermined conditions are satisfied in order from the condition having the lowest satisfaction level to the condition having the highest satisfaction level.

The multiple predetermined conditions may include a longitudinal direction position condition that the position of the obstacle in a longitudinal direction be within a predetermined range in the longitudinal direction and a lateral direction position condition that the position of the obstacle in a lateral direction be within a predetermined range in the lateral direction, and the sequence setter may calculate the satisfaction level of the longitudinal direction position condition of the obstacle based on the sensing range of the detection sensor in the longitudinal direction and the satisfaction level of the lateral direction position condition of the obstacle based on the sensing range of the detection sensor in the lateral direction.

The longitudinal direction position condition may be set between the minimum longitudinal direction position condition and the maximum longitudinal direction position condition, and the sequence setter may calculate the satisfaction level of the minimum longitudinal direction position condition based on the sensing range of the detection sensor in the longitudinal direction and the satisfaction level of the maximum longitudinal direction position condition based on the sensing range of the detection sensor in the longitudinal direction.

The lateral direction position condition may be set between the minimum lateral direction position condition and the maximum lateral direction position condition, and the sequence setter may calculate the satisfaction level of the minimum lateral direction position condition based on the sensing range of the detection sensor in the lateral direction and the satisfaction level of the maximum lateral direction position condition based on the sensing range of the detection sensor in the lateral direction.

The multiple predetermined conditions may further include a collision time condition that a time to collision with an obstacle in the longitudinal direction be equal to or less than a predetermined time, and the sequence setter may calculate the satisfaction level of the collision time condition based on the longitudinal-direction speed-sensing range of the detection sensor and the longitudinal-direction position-sensing range of the detection sensor.

When a condition among the multiple predetermined conditions has a satisfaction level of 1 or more, the warning determiner may omit determination of satisfaction of the condition having the satisfaction level of 1 or more, and may determine that the condition having the satisfaction level of 1 or more is satisfied.

In accordance with another aspect of the present disclosure, a rear lateral blind-spot warning method for a vehicle includes setting, based on the sensing range of a detection sensor, configured to sense an obstacle located in a rear blind spot or a lateral blind spot of a vehicle, and multiple predetermined conditions, a sequence, among the multiple predetermined conditions, of determining whether the conditions are satisfied, sequentially determining, based on the set sequence, whether the obstacle sensed by the detection sensor satisfies the multiple predetermined conditions, and determining, based on the result of determination with regard to satisfaction of the conditions, whether the sensed obstacle is a target to be monitored.

When the obstacle sensed by the detection sensor does not satisfy any one of the multiple predetermined conditions, in the sequentially determining whether the obstacle satisfies the multiple predetermined conditions, sequential determination may be stopped for remaining conditions of the multiple predetermined conditions, and in the determining whether the sensed obstacle is a target to be monitored, the sensed obstacle may be determined not to be a target to be monitored.

When the obstacle sensed by the detection sensor satisfies all of the multiple predetermined conditions, in the determining whether the sensed obstacle is a target to be monitored, the sensed obstacle may be determined to be a target to be monitored.

The setting the sequence may include calculating a satisfaction level of each of the multiple predetermined conditions based on the sensing range of the detection sensor, and setting, based on the calculated satisfaction level, the sequence of determining whether the multiple predetermined conditions are satisfied.

In the setting the sequence, the sequence of determining whether the multiple predetermined conditions are satisfied may be set in order from the condition having the lowest satisfaction level to the condition having the highest satisfaction level.

The multiple predetermined conditions may include a longitudinal direction position condition that the position of the obstacle in a longitudinal direction be within a predetermined range in the longitudinal direction and a lateral direction position condition that the position of the obstacle in a lateral direction be within a predetermined range in the lateral direction, and the setting the sequence may include calculating the satisfaction level of the longitudinal direction position condition of the obstacle based on the sensing range of the detection sensor in the longitudinal direction and the satisfaction level of the lateral direction position condition of the obstacle based on the sensing range of the detection sensor in the lateral direction.

The longitudinal direction position condition may be set between the minimum longitudinal direction position condition and the maximum longitudinal direction position condition, and the setting the sequence may include calculating the satisfaction level of the minimum longitudinal direction position condition based on the sensing range of the detection sensor in the longitudinal direction and the satisfaction level of the maximum longitudinal direction position condition based on the sensing range of the detection sensor in the longitudinal direction.

The lateral direction position condition may be set between the minimum lateral direction position condition and the maximum lateral direction position condition, and the setting the sequence may include calculating the satisfaction level of the minimum lateral direction position condition based on the sensing range of the detection sensor in the lateral direction and the satisfaction level of the maximum lateral direction position condition based on the sensing range of the detection sensor in the lateral direction.

The multiple predetermined conditions may further include a collision time condition that a time to collision with an obstacle in the longitudinal direction be equal to or less than a predetermined time, and the setting the sequence may include calculating the satisfaction level of the collision time condition based on the longitudinal-direction speed-sensing range of the detection sensor and the longitudinal-direction position-sensing range of the detection sensor.

The sequentially determining whether the obstacle satisfies the multiple predetermined conditions may include omitting, when a condition among the multiple predetermined conditions has a satisfaction level of 1 or more, determination of satisfaction of the condition having the satisfaction level of 1 or more, and determining that the condition having the satisfaction level of 1 or more is satisfied.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
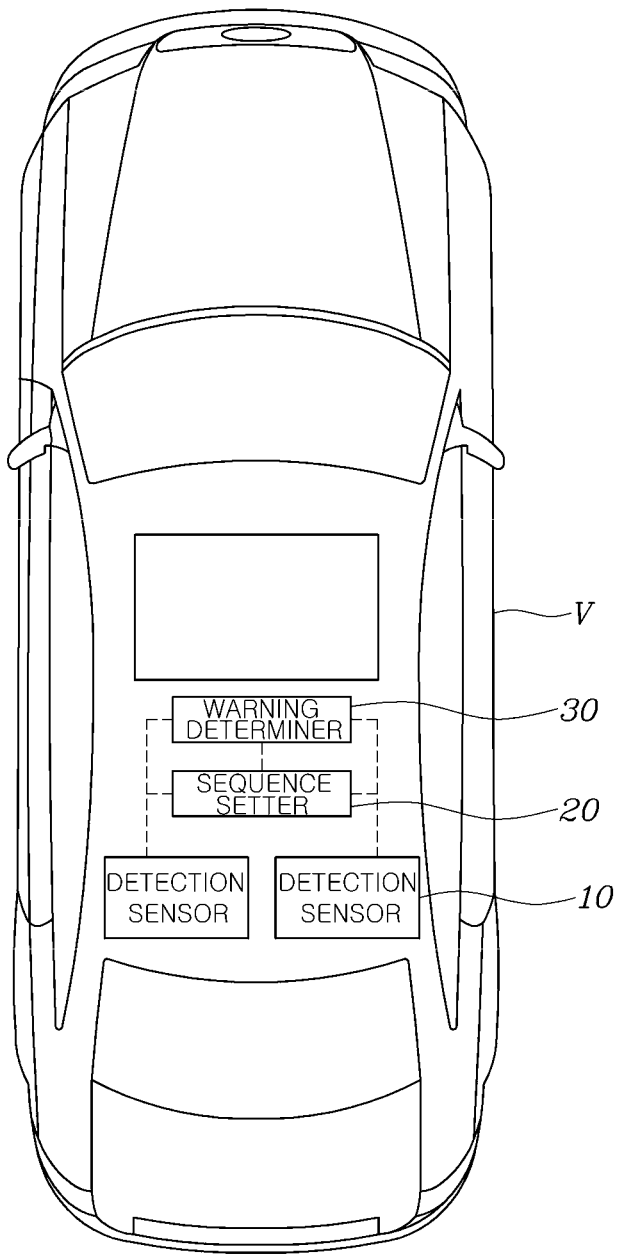
FIG. 1 is a diagram showing the configuration of a rear lateral blind-spot warning system for a vehicle according to an embodiment of the present disclosure.

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the present disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, exemplary embodiments of the present disclosure will be described in detail with reference to the accompanying drawings. In the drawings, the same reference numerals refer to the same components.

Figure 2:
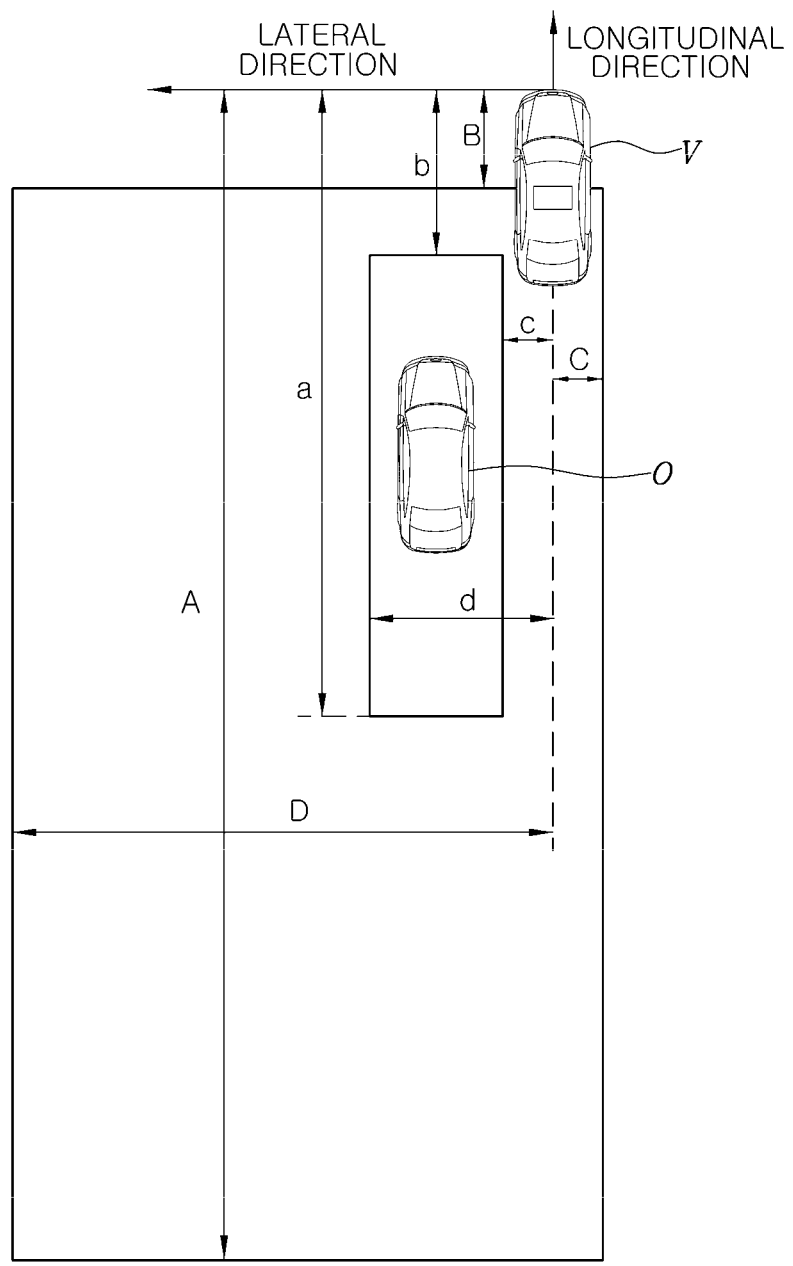
FIG. 2 is a diagram showing a sensing region and a warning region of the rear lateral blind-spot warning system for a vehicle according to the embodiment of the present disclosure.

FIG. 1 is a diagram showing the configuration of a rear lateral blind-spot warning system of a vehicle V according to an embodiment of the present disclosure, and FIG. 2 is a diagram showing a sensing region and a warning region of the rear lateral blind-spot warning system of the vehicle V according to the embodiment of the present disclosure.

Referring to FIGS. 1 and 2, the rear lateral blind-spot warning system of the vehicle V according to the embodiment of the present disclosure includes a detection sensor 10, which is installed in the vehicle V and senses an obstacle O located in the rear blind spot or the lateral blind spot of the vehicle V, a sequence setter 20, which sets a sequence in which to determine, based on the sensing range of the detection sensor 10 and multiple predetermined conditions, whether the respective conditions are satisfied, and a warning determiner 30, which sequentially determines, based on the sequence set by the sequence setter 20, whether the obstacle O sensed by the detection sensor 10 satisfies the multiple predetermined conditions and determines, based on the result of the determination with regard to satisfaction of the conditions, whether the sensed obstacle O is a target to be monitored.

According to an embodiment of the present disclosure, the rear lateral blind-spot warning system of the vehicle V may include a processor having an associated non-transitory memory storing software instructions which, when executed by the processor, provides the functionalities of the sequence setter 20 and/or the warning determiner 30. The processor may take the form of one or more processor(s) and associated memory storing program instructions.

The detection sensor 10 may sense an obstacle O located in the area on the rear lateral side of the vehicle V. In particular, the detection sensor 10 may sense the distance to the obstacle O, the moving direction of the obstacle O, and the moving speed of the obstacle O. The detection sensor 10 may sense the presence of an obstacle O located in a blind spot on the rear lateral side of the vehicle V, or may determine the probability of a collision with an obstacle O located in the area on the rear lateral side of the vehicle V when the vehicle V intends to change lanes.

In one embodiment, the detection sensor 10 may be a radar sensor installed in the vehicle V. In another embodiment, the detection sensor 10 may be a camera sensor, an ultrasonic sensor, or a laser sensor.

The warning determiner 30 may determine whether the obstacle O sensed by the detection sensor 10 satisfies multiple predetermined conditions, and may determine, based on the result of the determination with regard to satisfaction of the conditions, whether the sensed obstacle O is a target to be monitored.

In one embodiment, when at least one obstacle O is a target to be monitored, the warning determiner 30 may generate warning signals. The warning signals may be generated so as to be recognized by the driver of the vehicle V. For example, the warning determiner 30 may visually display warning messages on a cluster or a display device, or may generate warning sounds.

Based on the sensing range of the detection sensor 10 and multiple predetermined conditions, the sequence setter 20 may set a sequence, among the multiple predetermined conditions, of determining whether the sensed obstacle O satisfies the respective conditions.

Specifically, the sequence setter 20 may calculate a satisfaction level of each of the multiple predetermined conditions based on the sensing range of the detection sensor 10, and may set the sequence of determining whether the multiple predetermined conditions are satisfied.

When determining whether the multiple predetermined conditions are satisfied, the warning determiner 30 may sequentially determine, according to the sequence set by the sequence setter 20, whether the multiple predetermined conditions are satisfied.

Accordingly, when whether the obstacle O located in the area on the rear lateral side of the vehicle V is a target to be monitored is determined, it is possible to minimize the amount of computation. Further, even when many obstacles 0 are sensed at the same time, it is possible to increase the computation speed at which whether the obstacles 0 are targets to be monitored is determined.

In particular, when the obstacle O sensed by the detection sensor 10 does not satisfy any one of the multiple predetermined conditions, the warning determiner 30 may stop the sequential determination and may determine that the sensed obstacle O is not a target to be monitored.

Specifically, in the case in which the warning determiner 30 sequentially determines condition 1, condition 2, condition 3, and condition 4, when condition 1 is satisfied, the warning determiner 30 may determine condition 2, and when condition 2 is not satisfied, the warning determiner 30 may stop the determination without the necessity to determine condition 3 or 4, and may determine that the sensed obstacle O is not a target to be monitored.

That is, when any one condition is not satisfied during the sequential determination, the warning determiner 30 may stop the sequential determination, thereby reducing the amount of computation.

In addition, when the obstacle O sensed by the detection sensor 10 satisfies all of the multiple predetermined conditions, the warning determiner 30 may determine that the sensed obstacle O is a target to be monitored.

Specifically, in the case in which the warning determiner 30 sequentially determines condition 1, condition 2, condition 3, and condition 4, when all of condition 1 to condition 4 are satisfied, the warning determiner 30 may determine that the sensed obstacle O is a target to be monitored.

The sequence setter 20 may calculate a satisfaction level of each of the multiple predetermined conditions based on the sensing range of the detection sensor 10, and may set, based on the calculated satisfaction level, the sequence in which the multiple predetermined conditions are determined.

Here, the sensing range of the detection sensor 10 may be set based on the performance of the detection sensor 10 installed in the vehicle V. For example, the sensing range of the detection sensor 10 may be set to a range within which sensing information about the obstacle O, such as the position or the speed thereof sensed by the detection sensor 10, is reliable.

In particular, the sequence setter 20 may set the sequence of determining the multiple predetermined conditions in order from the condition having the lowest satisfaction level to the condition having the highest satisfaction level. As the satisfaction level is lower, the probability that the obstacle is determined not to be a target to be monitored increases. The determination sequence may be set in ascending order of satisfaction level.

Accordingly, the condition having the lowest satisfaction level, under which the probability that the obstacle is determined not to be a target to be monitored is the highest, is determined first, whereby it is possible to rapidly filter the obstacle O, which is not a target to be monitored.

The multiple predetermined conditions may include a longitudinal direction position condition that the position of the obstacle O in the longitudinal direction be within a predetermined range in the longitudinal direction and a lateral direction position condition that the position of the obstacle O in the lateral direction be within a predetermined range in the lateral direction. The sequence setter 20 may calculate the satisfaction level of the longitudinal direction position condition of the obstacle O based on the sensing range of the detection sensor 10 in the longitudinal direction and the satisfaction level of the lateral direction position condition of the obstacle O based on the sensing range of the detection sensor 10 in the lateral direction.

Specifically, the longitudinal direction position condition may be set between a minimum longitudinal direction position condition and a maximum longitudinal direction position condition, and the sequence setter 20 may calculate the satisfaction level of the minimum longitudinal direction position condition based on the sensing range of the detection sensor 10 in the longitudinal direction and the satisfaction level of the maximum longitudinal direction position condition based on the sensing range of the detection sensor 10 in the longitudinal direction.

In addition, the lateral direction position condition may be set between a minimum lateral direction position condition and a maximum lateral direction position condition, and the sequence setter 20 may calculate the satisfaction level of the minimum lateral direction position condition based on the sensing range of the detection sensor 10 in the lateral direction and the satisfaction level of the maximum lateral direction position condition based on the sensing range of the detection sensor 10 in the lateral direction.

Hereinafter, a blind-spot detection (BSD) system, which informs a driver of the presence of an obstacle O in the blind spot on the rear lateral side of the vehicle V, will be described based on the sensing region and the warning region shown in FIG. 2. In this case, the multiple predetermined conditions may include a longitudinal direction position condition and a lateral direction position condition, and each of the longitudinal direction position condition and the lateral direction position condition may be set between a minimum position condition and a maximum position condition.

In one example, the warning region may be set such that the minimum longitudinal direction position is "a" and the maximum longitudinal direction position is "b" (the longitudinal direction oriented toward the sensing region (i.e. the backward direction) being defined as a negative direction). That is, the position Y of the obstacle O in the longitudinal direction needs to satisfy the following condition: $a \leq Y \leq b$.

In addition, the warning region may be set such that the minimum lateral direction position is "c" and the maximum lateral direction position is "d" (the lateral direction oriented toward the sensing region being defined as a positive direction). That is, the position X of the obstacle O in the lateral direction needs to satisfy the following condition: $c \leq X \leq d$.

That is, the multiple predetermined conditions may include the minimum longitudinal direction position condition, the maximum longitudinal direction position condition, the minimum lateral direction position condition, and the maximum lateral direction position condition.

The sequence setter 20 may calculate the satisfaction level of the minimum longitudinal direction position condition based on the sensing range of the detection sensor 10 in the longitudinal direction and the satisfaction level of the maximum longitudinal direction position condition based on the sensing range of the detection sensor 10 in the longitudinal direction.

The position that can be sensed by the detection sensor 10 in the longitudinal direction may range from "A" to "B". In one example, the position that can be sensed by the detection sensor 10 in the longitudinal direction may be set to a range from −90 m to −1 m.

Among the multiple predetermined conditions, when the condition pertaining to the minimum position a of the obstacle O in the longitudinal direction is set to, for example, −10 m, the satisfaction level of the minimum longitudinal direction position condition may be calculated as follows.

$$\xi_a = \frac{|(-1)-(-10)|}{|(-1)-(-90)|} = 0.1011$$

In addition, among the multiple predetermined conditions, when the condition pertaining to the maximum position b of the obstacle O in the longitudinal direction is set to, for example, −3 m, the satisfaction level of the maximum longitudinal direction position condition may be calculated as follows.

$$\xi_b = \frac{|(-3)-(-90)|}{|(-1)-(-90)|} = 0.9775$$

In addition, the position that can be sensed by the detection sensor 10 in the lateral direction may range from "C" to "D". In one example, the position that can be sensed by the detection sensor 10 in the lateral direction may be set to a range from −2 m to 16 m.

Among the multiple predetermined conditions, when the condition pertaining to the minimum position c of the obstacle O in the lateral direction is set to, for example, 1 m, the satisfaction level of the minimum lateral direction position condition may be calculated as follows.

$$\xi_c = \frac{|(16)-(1)|}{|(16)-(-2)|} = 0.8333$$

In addition, among the multiple predetermined conditions, when the condition pertaining to the maximum position d of the obstacle O in the lateral direction is set to, for example, 5 m, the satisfaction level of the maximum lateral direction position condition may be calculated as follows.

$$\xi_d = \frac{|(5)-(-2)|}{|(16)-(-2)|} = 0.5$$

In this case, the sequence setter 20 may set the sequence of determining the multiple predetermined conditions in ascending order of satisfaction level, which is as follows.

Condition 1: Minimum value of longitudinal direction position Y is "a" (Y≥a)
Condition 2: Maximum value of lateral direction position X is "d" (X≤d)
Condition 3: Minimum value of lateral direction position X is "c" (X≥c)
Condition 4: Maximum value of longitudinal direction position Y is "b" (Y≤b)

Figure 3:
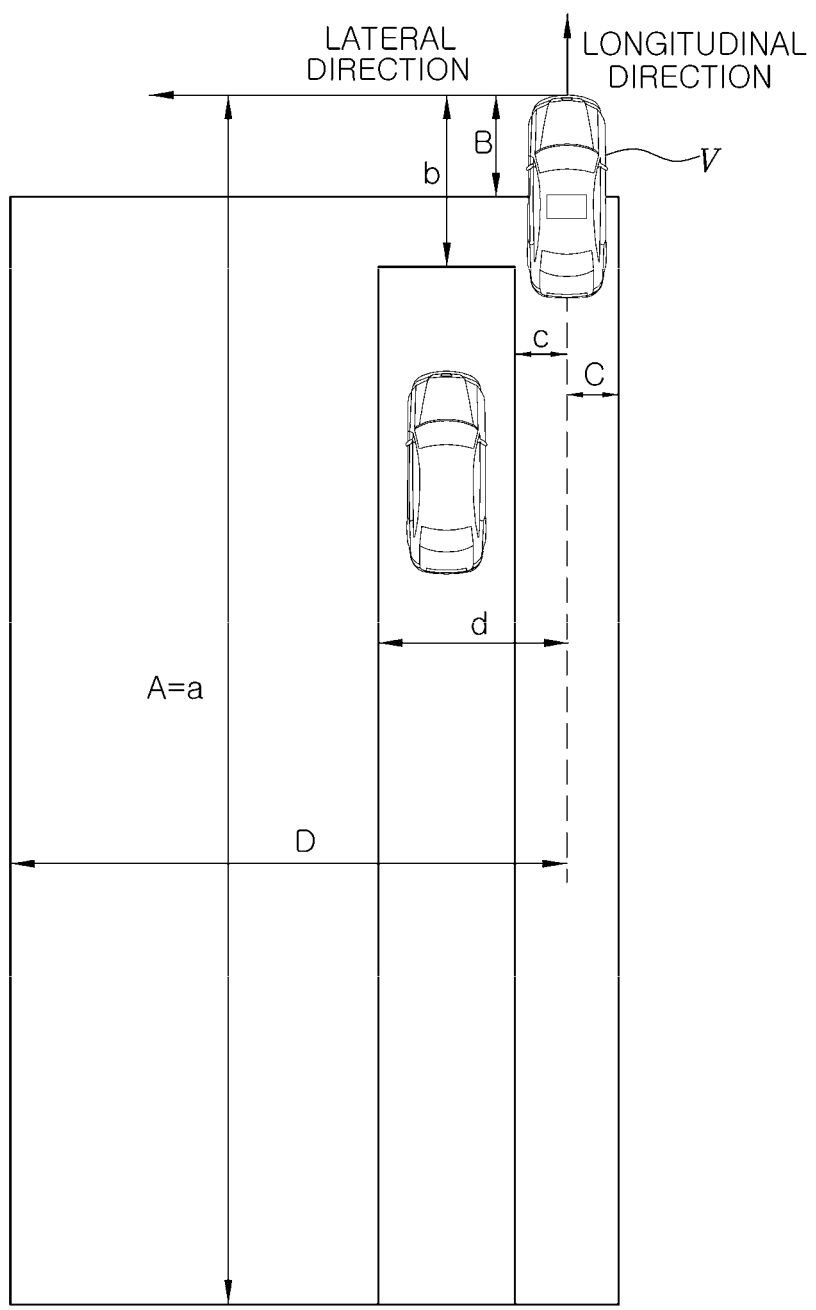
FIG. 3 is a diagram showing a sensing region and a warning region of a rear lateral blind-spot warning system for a vehicle according to another embodiment of the present disclosure.
Figure 4:
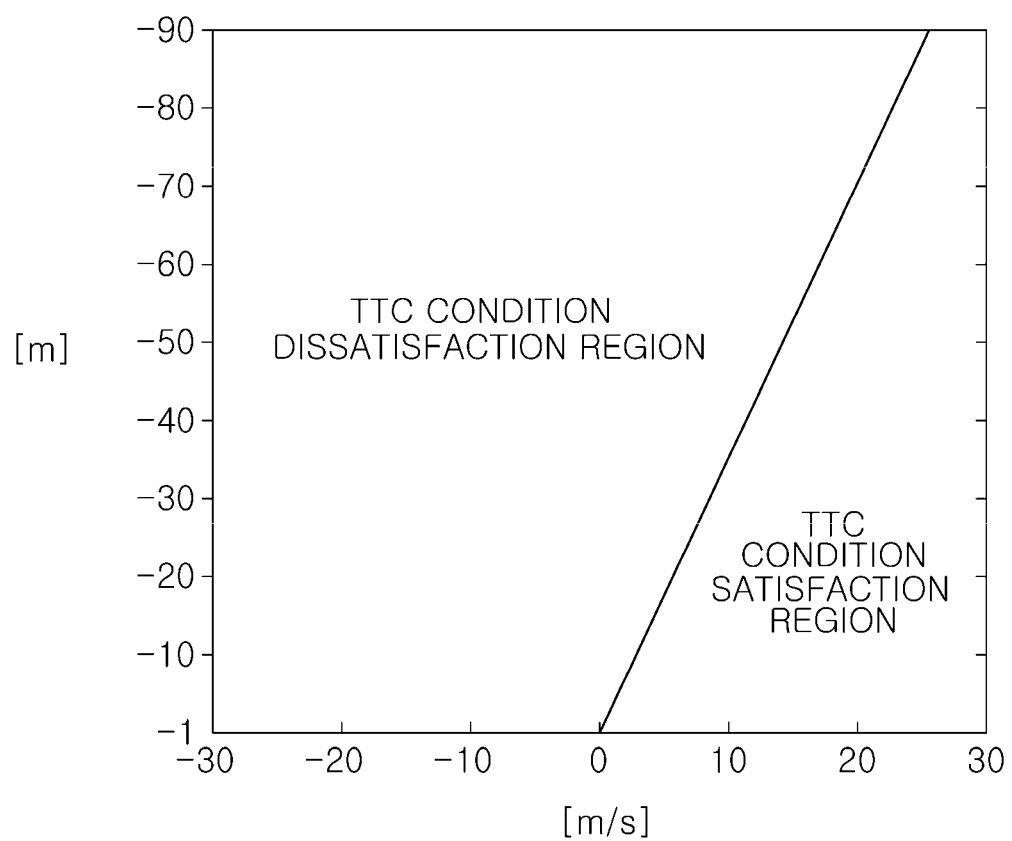
FIG. 4 is a diagram showing a collision time condition related to a time to collision with an obstacle in a longitudinal direction according to another embodiment of the present disclosure.

FIG. 3 is a diagram showing the sensing region and the warning region of a rear lateral blind-spot warning system of the vehicle V according to another embodiment of the present disclosure, and FIG. 4 is a diagram showing a collision time condition related to a time to collision with the obstacle O in the longitudinal direction according to another embodiment of the present disclosure.

Hereinafter, a lane-change assist (LCA) system, which determines the probability of a collision between the vehicle V, which intends to change lanes, and the obstacle approaching at a high speed in a rear lateral blind spot and provides a collision warning to a driver, will be described with reference to FIGS. 3 and 4.

It is assumed that all of the conditions determined in the LCA system are the same as those described above. Among the multiple predetermined conditions, when the condition pertaining to the minimum position a of the obstacle O in the longitudinal direction is set to −90 m, which is equal to the maximum distance that can be sensed by the detection sensor in the longitudinal direction, the satisfaction level of the minimum longitudinal direction position condition may be calculated as follows.

$$\xi_a = \frac{|(-1)-(-90)|}{|(-1)-(-90)|} = 1.0$$

The warning determiner 30 may omit the determination of satisfaction of the condition having the satisfaction level of 1 or more, which is calculated by the sequence setter 20, among the multiple predetermined conditions, and may determine that the condition having the satisfaction level of 1 or more is satisfied.

That is, all obstacles O sensed by the detection sensor 10 may be determined to satisfy conditions, the satisfaction levels of which are calculated to be 1 or more, without the necessity to determine whether the corresponding conditions are satisfied.

The multiple predetermined conditions may further include a collision time condition that a time to collision (TTC) with the obstacle O in the longitudinal direction be equal to or less than a predetermined time t_default, and the sequence setter 20 may calculate the satisfaction level of the collision time condition based on the longitudinal-direction speed-sensing range of the detection sensor 10 and the longitudinal-direction position-sensing range of the detection sensor 10.

Specifically, the time to collision (TTC) with the obstacle O in the longitudinal direction may be calculated using the following equation.

$$TTC = -\frac{Y\_pos}{Y\_vel}$$

Here, Y_pos represents the position of the obstacle O in the longitudinal direction, and Y_vel represents the speed of the obstacle O in the longitudinal direction.

FIG. 4 is a diagram showing the satisfaction region and the dissatisfaction region of the collision time condition when the predetermined time t_default, which is a threshold time for determination of the time to collision (TTC) with the obstacle O in the longitudinal direction, is set to 3.5 seconds.

Here, the X-axis represents the longitudinal direction speed that can be sensed by the detection sensor 10, which is set to a range, for example, from −30 m/s to 30 m/s, and the Y-axis represents the longitudinal direction position that can be sensed by the detection sensor 10, which is set to a range, for example, from −90 m to −1 m.

Accordingly, the satisfaction level of the collision time condition may be calculated as follows.

$$\xi_t = \frac{|\text{TTC CONDITION SATISFACTION REGION}|}{|\text{SENSING REGION}|} =$$

$$\frac{|\text{TTC CONDITION SATISFACTION REGION}|}{|(F-E) \cdot (B-A)|} =$$

$$\frac{\left|\frac{((30+4)) \cdot 89}{2}\right|}{|60 \cdot 89|} = 0.2917$$

In this case, the sequence setter 20 may set the sequence of determining the multiple predetermined conditions in ascending order of satisfaction level, which is as follows.

Condition 1: Time to collision TTC with obstacle in longitudinal direction is equal to or less than predetermined time t_default (TTC≤t_default)

Condition 2: Maximum value of lateral direction position X is "d" (X≤d)

Condition 3: Minimum value of lateral direction position X is "c" (X≥c)

Condition 4: Maximum value of longitudinal direction position Y is "b" (Y≤b)

Here, since the satisfaction level of the condition in which the minimum value of the position Y of the obstacle O in the longitudinal direction is "a" (Y≥a) is calculated to be 1, this condition may be determined to be satisfied without a separate determination process.

In addition, when the obstacle O moves away from the host vehicle (Y_vel≤0), when the obstacle O is located beside or ahead of the host vehicle (Y_pos>0), or when the TTC value is greater than the TTC threshold value (TTC>t_default), the sequence setter 20 may set the time to collision with the obstacle O in the longitudinal direction to the predetermined TTC threshold value, or may set the calculated satisfaction level to 1. Accordingly, it is possible to reduce the amount of computation performed by the warning determiner 30.

Figure 5:
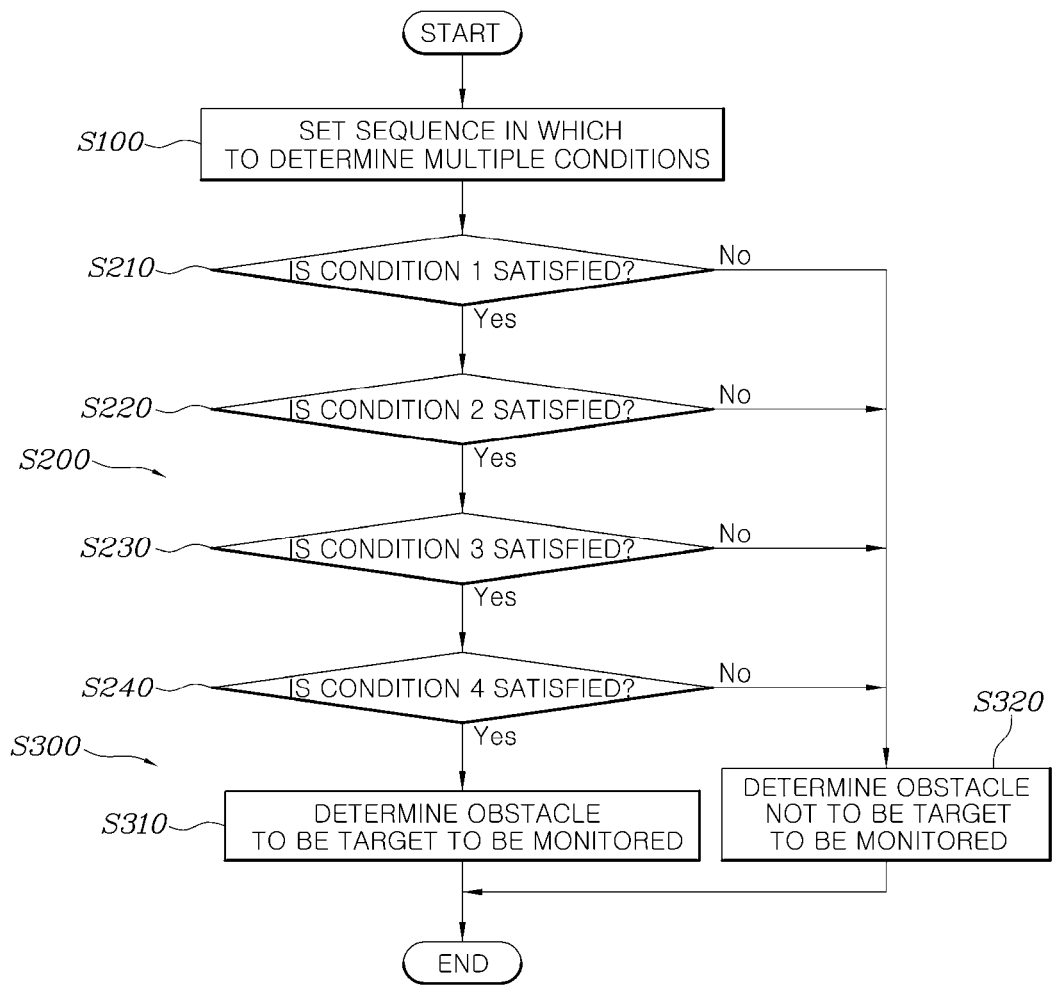
FIG. 5 is a flowchart showing a rear lateral blind-spot warning method for a vehicle according to an embodiment of the present disclosure.

FIG. 5 is a flowchart showing a rear lateral blind-spot warning method of the vehicle V according to an embodiment of the present disclosure.

Referring to FIG. 5, a rear lateral blind-spot warning method of the vehicle V according to an embodiment of the present disclosure includes setting a sequence in which to determine, based on the sensing range of the detection sensor 10, which senses an obstacle O located in the rear blind spot or the lateral blind spot of the vehicle V, and multiple predetermined conditions, whether the respective conditions are satisfied (S100), sequentially determining, based on the set sequence, whether the obstacle O sensed by the detection sensor 10 satisfies the multiple predetermined conditions (S200), and determining, based on the result of the determination with regard to satisfaction of the conditions, whether the sensed obstacle O is a target to be monitored (S300).

When the obstacle O sensed by the detection sensor 10 does not satisfy any one of the multiple predetermined conditions, in the sequentially determining whether the obstacle satisfies the multiple predetermined conditions (S200), the sequential determination may be stopped, and in the determining whether the sensed obstacle O is a target to be monitored (S300), the sensed obstacle O may be determined not to be a target to be monitored.

When the obstacle O sensed by the detection sensor 10 satisfies all of the multiple predetermined conditions, in the determining whether the sensed obstacle O is a target to be monitored (S300), the sensed obstacle O may be determined to be a target to be monitored (S310).

The setting the sequence (S100) may include calculating a satisfaction level of each of the multiple predetermined conditions of the obstacle O based on the sensing range of the detection sensor 10, and setting, based on the calculated satisfaction level, the sequence in which the multiple predetermined conditions are determined.

In the setting the sequence (S100), the sequence in which the multiple predetermined conditions are determined may be set in order from the condition having the lowest satisfaction level to the condition having the highest satisfaction level.

The multiple predetermined conditions (S210, S220, S230, and S240) may include a longitudinal direction position condition that the position of the obstacle O in the longitudinal direction be within a predetermined range in the longitudinal direction, and a lateral direction position condition that the position of the obstacle O in the lateral direction be within a predetermined range in the lateral direction. The setting the sequence (S100) may include calculating the satisfaction level of the longitudinal direction position condition of the obstacle O based on the sensing range of the detection sensor 10 in the longitudinal direction and the satisfaction level of the lateral direction position condition of the obstacle O based on the sensing range of the detection sensor 10 in the lateral direction.

The longitudinal direction position condition may be set between a minimum longitudinal direction position condition and a maximum longitudinal direction position condition. The setting the sequence (S100) may include calculating the satisfaction level of the minimum longitudinal direction position condition based on the sensing range of the detection sensor 10 in the longitudinal direction and the satisfaction level of the maximum longitudinal direction position condition based on the sensing range of the detection sensor 10 in the longitudinal direction.

The lateral direction position condition may be set between a minimum lateral direction position condition and a maximum lateral direction position condition. The setting the sequence (S100) may include calculating the satisfaction level of the minimum lateral direction position condition based on the sensing range of the detection sensor 10 in the lateral direction and the satisfaction level of the maximum lateral direction position condition based on the sensing range of the detection sensor 10 in the lateral direction.

The multiple predetermined conditions (S210, S220, S230, and S240) may further include a collision time condition that a time to collision with the obstacle O in the longitudinal direction be equal to or less than a predetermined time. The setting the sequence (S100) may include calculating the satisfaction level of the collision time condition based on the longitudinal-direction speed-sensing range of the detection sensor 10 and the longitudinal-direction position-sensing range of the detection sensor 10.

The sequentially determining whether the obstacle satisfies the multiple predetermined conditions (S200) may include omitting determination of the satisfaction of the condition having the satisfaction level of 1 or more, among the multiple predetermined conditions, and determining that the condition having the satisfaction level of 1 or more is satisfied.

Figure 6:
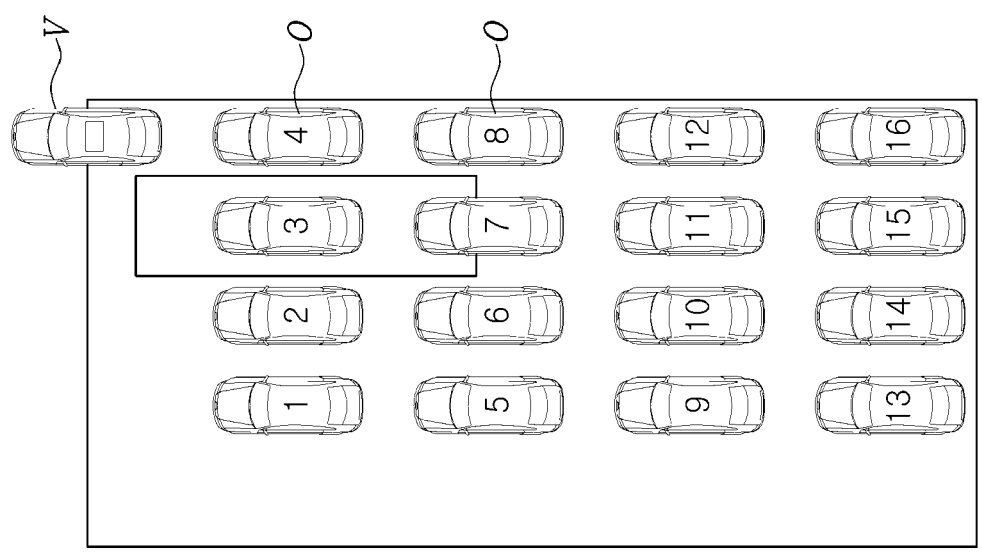
FIG. 6 is a diagram showing a comparison between the number of computations performed in the rear lateral blind-spot warning system and method for a vehicle according to the embodiment of the present disclosure and the number of computations performed in a conventional art.

FIG. 6 is a diagram showing a comparison between the number of computations performed in the rear lateral blind-spot warning system and method of the vehicle V according to the embodiment of the present disclosure and the number of computations performed in a conventional art.

Referring to FIG. 6, in the case in which $1^{st}$ to $16^{th}$ obstacles O are located within the sensing range of the detection sensor 10, which senses the area on the rear lateral side of the vehicle V, according to the conventional art, it is required to determine all of multiple predetermined conditions.

According to the conventional art, respective conditions are determined, and thereafter, whether all of the conditions are satisfied is additionally determined. Therefore, in the case in which the number of multiple predetermined conditions is, for example, four, it is required to perform five computations for each obstacle O. As a result, the total number of computations for sixteen obstacles O is 80.

In contrast, according to the present disclosure, whether the $3^{rd}$ obstacle O, which is located in the warning region, satisfies four respective conditions is determined, and when the final condition is satisfied, the $3^{rd}$ obstacle O is determined to be a target to be monitored. Accordingly, computation is performed not more than four times.

In addition, since the $1^{st}$ and $2^{nd}$ obstacles O and the $4^{th}$ to $16^{th}$ obstacles O do not satisfy all of the multiple predetermined conditions, each of these obstacles is determined not to be a target to be monitored, and at this time, computation is performed less than four times for each obstacle. Accordingly, as shown in FIG. 6, the total number of computations for sixteen obstacles O is 30.

As a result, the rear lateral blind-spot warning system and method of the vehicle V according to the present disclosure exhibit an effect of reduction in the amount of computation by 62.5% compared to the conventional art.

As is apparent from the above description, a rear lateral blind-spot warning system and method for a vehicle according to the present disclosure are capable of minimizing the amount of computation when determining whether an obstacle located in an area on the rear lateral side of a host vehicle is a target to be monitored.

In addition, even when many obstacles are sensed at the same time, it is possible to increase the computation speed at which whether the obstacles are targets to be monitored is determined.

Although exemplary embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A rear lateral blind-spot warning system for a vehicle, comprising:
   a detection sensor installed in a vehicle, the detection sensor configured to sense an obstacle located in a rear blind spot or a lateral blind spot of the vehicle;
   a sequence setter configured, based on a sensing range of the detection sensor and multiple predetermined conditions, to set a sequence, among the multiple predetermined conditions, of determining whether the multiple predetermined conditions are satisfied; and
   a warning determiner configured to sequentially determine, based on the sequence set by the sequence setter, whether the obstacle sensed by the detection sensor satisfies the multiple predetermined conditions and to determine, based on a result of determination with regard to satisfaction of the multiple predetermined conditions, whether the sensed obstacle is a target to be monitored,
   wherein the sequence setter calculates a satisfaction level of each of the multiple predetermined conditions based on the sensing range of the detection sensor, and sets, based on the calculated satisfaction level, the sequence of determining whether the multiple predetermined conditions are satisfied.

2. The rear lateral blind-spot warning system for a vehicle of claim 1, wherein, when the obstacle sensed by the detection sensor does not satisfy any one of the multiple predetermined conditions, the warning determiner stops sequential determination for remaining conditions of the multiple predetermined conditions and determines that the sensed obstacle is not a target to be monitored.

3. The rear lateral blind-spot warning system of claim 1, wherein, when the obstacle sensed by the detection sensor satisfies all of the multiple predetermined conditions, the warning determiner determines that the sensed obstacle is a target to be monitored.

4. The rear lateral blind-spot warning system of claim 1, wherein the sequence setter sets the sequence of determining whether the multiple predetermined conditions are satisfied in order from a condition having a lowest satisfaction level to a condition having a highest satisfaction level.

5. The rear lateral blind-spot warning system of claim 1, wherein the multiple predetermined conditions comprise a longitudinal direction position condition that a position of the obstacle in a longitudinal direction be within a predetermined range in the longitudinal direction and a lateral direction position condition that a position of the obstacle in a lateral direction be within a predetermined range in the lateral direction, and
   wherein the sequence setter calculates a satisfaction level of the longitudinal direction position condition of the obstacle based on a sensing range of the detection sensor in the longitudinal direction and a satisfaction level of the lateral direction position condition of the obstacle based on a sensing range of the detection sensor in the lateral direction.

6. The rear lateral blind-spot warning system of claim 5, wherein the longitudinal direction position condition is set between a minimum longitudinal direction position condition and a maximum longitudinal direction position condition, and
   wherein the sequence setter calculates a satisfaction level of the minimum longitudinal direction position condition based on the sensing range of the detection sensor in the longitudinal direction and a satisfaction level of the maximum longitudinal direction position condition based on the sensing range of the detection sensor in the longitudinal direction.

7. The rear lateral blind-spot warning system of claim 5, wherein the lateral direction position condition is set between a minimum lateral direction position condition and a maximum lateral direction position condition, and
   wherein the sequence setter calculates a satisfaction level of the minimum lateral direction position condition based on the sensing range of the detection sensor in the lateral direction and a satisfaction level of the maximum lateral direction position condition based on the sensing range of the detection sensor in the lateral direction.

8. The rear lateral blind-spot warning system of claim 5, wherein the multiple predetermined conditions further comprise a collision time condition that a time to collision with an obstacle in the longitudinal direction be equal to or less than a predetermined time, and wherein the sequence setter calculates a satisfaction level of the collision time condition based on a longitudinal-direction speed-sensing range of the detection sensor and a longitudinal-direction position-sensing range of the detection sensor.

9. The rear lateral blind-spot warning system of claim 1, wherein, when a condition among the multiple predetermined conditions has a satisfaction level of 1 or more, the warning determiner omits determination of satisfaction of the condition having the satisfaction level of 1 or more, and determines that the condition having the satisfaction level of 1 or more is satisfied.

10. A rear lateral blind-spot warning method for a vehicle, comprising:
setting, based on a sensing range of a detection sensor, configured to sense an obstacle located in a rear blind spot or a lateral blind spot of a vehicle, and multiple predetermined conditions, a sequence, among the multiple predetermined conditions, of determining whether the multiple predetermined conditions are satisfied;
sequentially determining, based on the set sequence, whether the obstacle sensed by the detection sensor satisfies the multiple predetermined conditions; and
determining, based on a result of determination with regard to satisfaction of the multiple predetermined conditions, whether the sensed obstacle is a target to be monitored,
wherein the setting the sequence comprises:
calculating a satisfaction level of each of the multiple predetermined conditions based on the sensing range of the detection sensor; and
setting, based on the calculated satisfaction level, the sequence of determining whether the multiple predetermined conditions are satisfied.

11. The rear lateral blind-spot warning method for a vehicle of claim 10, wherein, when the obstacle sensed by the detection sensor does not satisfy any one of the multiple predetermined conditions, in the sequentially determining whether the obstacle satisfies the multiple predetermined conditions, sequential determination is stopped for remaining conditions of the multiple predetermined conditions, and
wherein, in the determining whether the sensed obstacle is a target to be monitored, the sensed obstacle is determined not to be a target to be monitored.

12. The rear lateral blind-spot warning method of claim 10, wherein, when the obstacle sensed by the detection sensor satisfies all of the multiple predetermined conditions, in the determining whether the sensed obstacle is a target to be monitored, the sensed obstacle is determined to be a target to be monitored.

13. The rear lateral blind-spot warning method of claim 10, wherein, in the setting the sequence, the sequence of determining whether the multiple predetermined conditions are satisfied is set in order from a condition having a lowest satisfaction level to a condition having a highest satisfaction level.

14. The rear lateral blind-spot warning method of claim 10, wherein the multiple predetermined conditions comprise a longitudinal direction position condition that a position of the obstacle in a longitudinal direction be within a predetermined range in the longitudinal direction and a lateral direction position condition that a position of the obstacle in a lateral direction be within a predetermined range in the lateral direction, and
wherein the setting the sequence comprises calculating a satisfaction level of the longitudinal direction position condition of the obstacle based on a sensing range of the detection sensor in the longitudinal direction and a satisfaction level of the lateral direction position condition of the obstacle based on a sensing range of the detection sensor in the lateral direction.

15. The rear lateral blind-spot warning method of claim 14, wherein the longitudinal direction position condition is set between a minimum longitudinal direction position condition and a maximum longitudinal direction position condition, and
wherein the setting the sequence comprises calculating a satisfaction level of the minimum longitudinal direction position condition based on the sensing range of the detection sensor in the longitudinal direction and a satisfaction level of the maximum longitudinal direction position condition based on the sensing range of the detection sensor in the longitudinal direction.

16. The rear lateral blind-spot warning method of claim 14, wherein the lateral direction position condition is set between a minimum lateral direction position condition and a maximum lateral direction position condition, and
wherein the setting the sequence comprises calculating a satisfaction level of the minimum lateral direction position condition based on the sensing range of the detection sensor in the lateral direction and a satisfaction level of the maximum lateral direction position condition based on the sensing range of the detection sensor in the lateral direction.

17. The rear lateral blind-spot warning method of claim 14, wherein the multiple predetermined conditions further comprise a collision time condition that a time to collision with an obstacle in the longitudinal direction be equal to or less than a predetermined time, and
wherein the setting the sequence comprises calculating a satisfaction level of the collision time condition based on a longitudinal-direction speed-sensing range of the detection sensor and a longitudinal-direction position-sensing range of the detection sensor.

18. The rear lateral blind-spot warning method of claim 10, wherein the sequentially determining whether the obstacle satisfies the multiple predetermined conditions comprises:
omitting, when a condition among the multiple predetermined conditions has a satisfaction level of 1 or more, determination of satisfaction of the condition having the satisfaction level of 1 or more; and
determining that the condition having the satisfaction level of 1 or more is satisfied.

* * * * *